US012036763B2

(12) United States Patent
Capoia

(10) Patent No.: US 12,036,763 B2
(45) Date of Patent: Jul. 16, 2024

(54) PNEUMATIC DRIVE UNIT FOR A WORK TOOL OF A RELATIVELY RIGID MATERIAL AND CORRESPONDING MACHINE FOR WORKING A RELATIVELY RIGID MATERIAL

(71) Applicant: INTERNATIONAL BOXES S.R.L., Cimadolmo (IT)

(72) Inventor: Giuseppe Capoia, Cimadolmo (IT)

( * ) Notice: Subject to any disclaimer, the term of this patent is extended or adjusted under 35 U.S.C. 154(b) by 0 days.

(21) Appl. No.: 15/736,647

(22) PCT Filed: Jun. 16, 2016

(86) PCT No.: PCT/IB2016/053582
§ 371 (c)(1),
(2) Date: Dec. 14, 2017

(87) PCT Pub. No.: WO2016/203424
PCT Pub. Date: Dec. 22, 2016

(65) Prior Publication Data

US 2018/0178480 A1 Jun. 28, 2018

(30) Foreign Application Priority Data

Jun. 17, 2015 (IT) ........................ 102015000024795

(51) Int. Cl.

| | |
|---|---|
| ***B31F 1/10*** | (2006.01) |
| ***B26D 1/22*** | (2006.01) |
| ***B26D 3/08*** | (2006.01) |
| ***B26D 7/20*** | (2006.01) |
| ***B26D 7/26*** | (2006.01) |
| ***B31B 50/20*** | (2017.01) |
| ***B31B 50/25*** | (2017.01) |
| ***B31F 1/08*** | (2006.01) |

(52) U.S. Cl.
CPC ................ *B31F 1/10* (2013.01); *B26D 1/225* (2013.01); *B26D 3/085* (2013.01); *B26D 7/204* (2013.01); *B26D 7/2635* (2013.01); *B31B 50/20* (2017.08); *B31B 50/25* (2017.08); *B31B 50/256* (2017.08); *B31F 1/08* (2013.01)

(58) Field of Classification Search
CPC ... B31F 1/10; B31F 1/08; B31B 50/25; B31B 50/20; B31B 50/256; B26D 1/225; B26D 3/085; B26D 7/204; B26D 7/2635
USPC .......................................................... 493/475
See application file for complete search history.

(56) References Cited

U.S. PATENT DOCUMENTS

| | | | | |
|---|---|---|---|---|
| 3,636,707 A * | 1/1972 | Saari | B25C 1/005 | 92/15 |
| 3,651,723 A * | 3/1972 | Gallagher, Jr. | B26D 7/2635 | 83/864 |
| 3,805,652 A * | 4/1974 | LaLonde | B26D 1/565 | 83/169 |
| 4,616,815 A * | 10/1986 | Vijuk | B65H 3/48 | 270/45 |

(Continued)

FOREIGN PATENT DOCUMENTS

| | | |
|---|---|---|
| DE | 10 2008 060073 A1 | 6/2010 |
| EP | 2193890 A1 | 6/2010 |

(Continued)

*Primary Examiner* — Sameh Tawfik
(74) *Attorney, Agent, or Firm* — Themis Law

(57) ABSTRACT

Machine to work a relatively rigid material, which comprises a plurality of operating units (20*a*, 20*b*) to work the relatively rigid material.

13 Claims, 9 Drawing Sheets

(56) References Cited

U.S. PATENT DOCUMENTS

| | | | | | |
|---|---|---|---|---|---|
| 5,701,727 | A * | 12/1997 | Lundstrom | B43M 5/04 156/441.5 |
| 5,916,079 | A * | 6/1999 | Haring | B31B 50/00 493/125 |
| 6,071,222 | A * | 6/2000 | Schneider | B26D 1/245 493/355 |
| 6,582,348 | B2 * | 6/2003 | Bacciottini | B31F 1/10 271/10.01 |
| 8,281,694 | B2 * | 10/2012 | Okihara | B26D 1/245 83/13 |
| 8,500,111 | B2 * | 8/2013 | Terao | B65H 45/18 270/32 |
| 9,120,284 | B2 * | 9/2015 | Capoia | B26D 7/2635 |
| 9,138,905 | B2 * | 9/2015 | Daul | B26D 7/2635 |
| 10,245,803 | B2 * | 4/2019 | Clark | B31F 7/00 |

FOREIGN PATENT DOCUMENTS

| | | | | |
|---|---|---|---|---|
| WO | WO 2011/007237 | A1 | 1/2011 | |
| WO | WO-2015198198 | A1 * | 12/2015 | |
| WO | WO-2016001866 | A1 * | 1/2016 | B26D 1/141 |

* cited by examiner

PNEUMATIC DRIVE UNIT FOR A WORK TOOL OF A RELATIVELY RIGID MATERIAL AND CORRESPONDING MACHINE FOR WORKING A RELATIVELY RIGID MATERIAL

FIELD OF THE INVENTION

Embodiments described here concern a machine to work a relatively rigid material. In particular, embodiments described here are used for cutting, continuous toothed creasing and/or discontinuous toothed creasing, or pre-creasing paper, cardboard, plastic material or other, originally in the form of strips or sheets, in order to make containers. Here and hereafter in the description and the claims, by the term "sheet" we mean generally both pre-cut individual sheets and also sheets coming from a reel or strip. Embodiments described here also concern a pneumatic drive unit for an operating unit that allows to perform the function of cutting and/or continuous and/or discontinuous toothed creasing and/or pre-creasing.

BACKGROUND OF THE INVENTION

In the packaging field, plants are known that are used to make containers by a plurality of workings on a packing material, for example a sheet of cardboard.

Known plants generally comprise a plurality of machines, disposed in series operationally, and each of which is provided with a support structure substantially transverse to the direction of feed of the sheet.

One type of machine provided in such plants comprises at least one operating group that performs the function of cutting and/or creasing, with a pair of operating units, each of which supports, moves and commands both a cutting tool and a creasing tool.

Solutions are known where the operating group has work tools suitable to operate both in a direction transverse to the direction of feed of the sheet, and also in a direction longitudinal to the direction of feed of the sheet.

The problem arises that the operating groups have limited performance, in particular the work tools have limited speeds in the cutting and/or creasing operations.

It is therefore necessary to speed up the cutting and/or creasing operations, especially in the transverse direction which is operationally slower, since the progress is static with respect to the longitudinal direction.

Furthermore, the typical configuration of the operating groups causes problems of bulk and greater weight to be supported by the support and sliding elements, and also limits the range of workings that the machine can perform.

It is known that in order to fit out the operating groups in a transverse and longitudinal direction, a gear mechanism with a pinion and rack is used, entailing more noise during the movement of the operating groups.

Moreover, a gear mechanism with a pinion and rack needs more maintenance. In known plants, an automated system is provided for loading the sheets, in which the operation to introduce the sheet entails a wait that reduces the practicality of the plant.

An automated system for introducing the sheets provides an apparatus to automatically feed different types of sheets and a device for loading the sheets located immediately upstream of the plant.

If the sheets jam between the loading device and the plant, the operation to free the machine causes a machine downtime that reduces the operating times of the latter.

Document WO-A-2011/007237 in the name of the present Applicant describes a machine for cutting and/or pre-creasing a relatively rigid material of a known type.

Document WO-A-2010/029418 in the name of the present Applicant describes an apparatus for loading a relatively rigid material of a known type.

Documents WO-A-2010/029416 and WO-A-2012/131482 in the name of the present Applicant describe tools for working a relatively rigid material of a known type.

There is therefore a need to perfect a pneumatic drive unit for a tool for working a relatively rigid material and corresponding machine for working a relatively rigid material that can overcome at least one of the disadvantages of the state of the art.

One purpose of the present invention is to increase the fitting out speeds for longitudinal and transverse operating groups, and the speeds of the drawing operation.

Another purpose of the present invention is to obtain a machine for working cartons that provides limited maintenance times.

Another purpose of the present invention is to reduce the waiting times for working a subsequent sheet.

Another purpose of the present invention is to obtain a machine and operating groups that allow to exploit to the utmost the potential productivity of the machine and that have limited bulk, precision working and limited costs.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

Embodiments described here concern a pneumatic drive unit for a work tool of a relatively rigid material.

According to one embodiment, the pneumatic drive unit comprises two pairs of pneumatic drive members, each provided with two double-effect pistons configured to work parallel in tandem.

The pistons are connected to each other by a pneumatic tool-descent circuit and by a pneumatic tool-ascent circuit, both able to supply a pressurized fluid to the pistons.

The pneumatic drive unit also comprises a switching valve mounted directly on board the pneumatic drive unit and connected to the pneumatic tool-descent circuit and to the pneumatic tool-ascent circuit.

The switching valve is configured to determine a pneumatic condition of descent, or ascent, of the two pairs of pneumatic drive members.

Advantageously, this possible configuration allows to obtain greater response speed by the pneumatic drive unit in order to determine the two pneumatic conditions of descent or ascent.

The present invention also provides an operating unit for working a relatively rigid material that comprises a work tool, a support flange, able to support the work tool, and the pneumatic drive unit.

Furthermore, embodiments described here concern a machine for working a relatively rigid material.

According to one embodiment, the machine comprises a plurality of operating units for working a relatively rigid material.

According to one embodiment, the operating units comprise longitudinal operating units and transverse operating units.

These and other aspects, characteristics and advantages of the present disclosure will be better understood with reference to the following description, drawings and attached claims. The drawings, which are integrated and form part of the present description, show some forms of embodiment of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION SOME EMBODIMENTS

We shall now refer in detail to the various embodiments of the present invention, of which one or more examples are shown in the attached drawing. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative. The use of terms such as "including", "comprising", "having" and their variations is intended to include the elements listed after them and their equivalents, and also additional elements. Unless otherwise specified, terms such as "mounted", "connected", "supported" and "coupled" and their variations are used in the widest sense and include both direct and indirect assemblies, connections, supports and couplings. Furthermore, the terms "connected" and "coupled" cannot be limited to physical or mechanical connections or couplings.

Figure 1B:
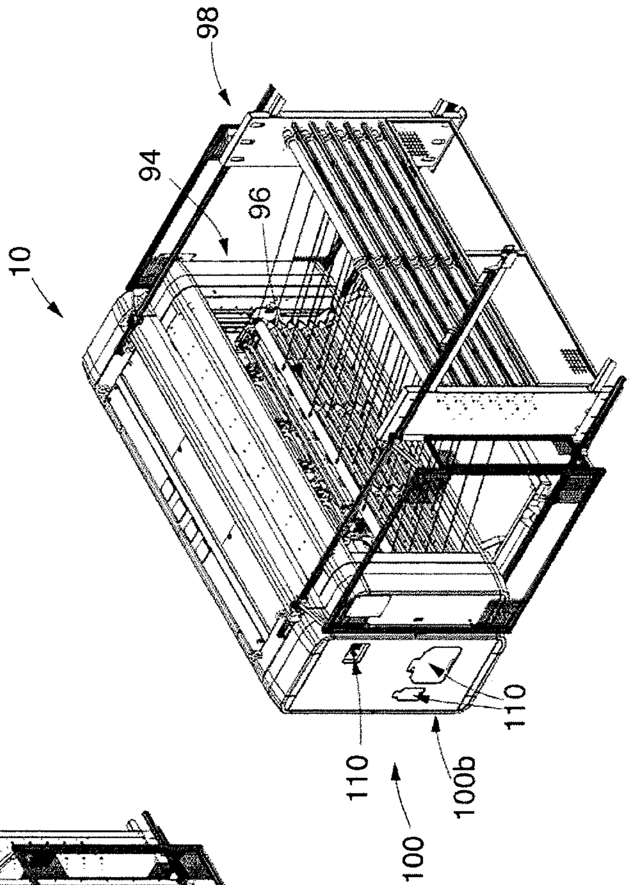
FIG. 1*b* is a perspective view of a machine in one embodiment.
Figure 1A:
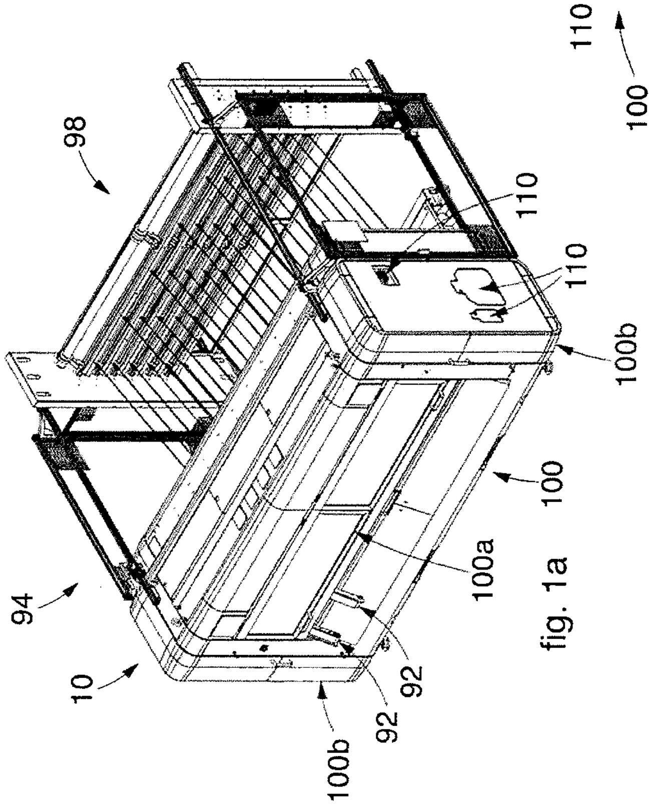
FIG. 1*a* is a perspective view of a machine in one embodiment.
Figure 3:
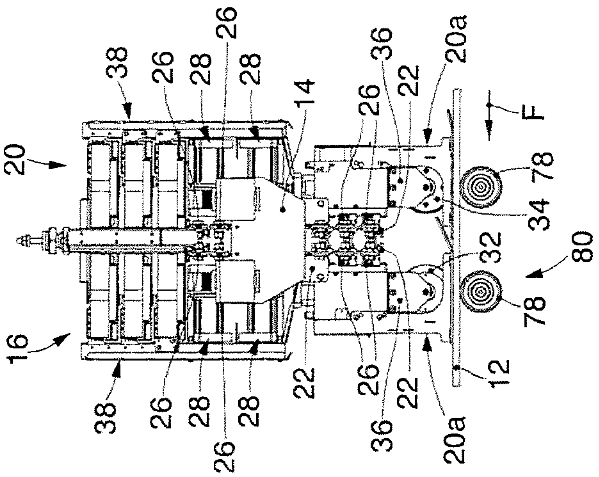
FIG. 3 is a lateral view of longitudinal operating units in one embodiment.
Figure 2:
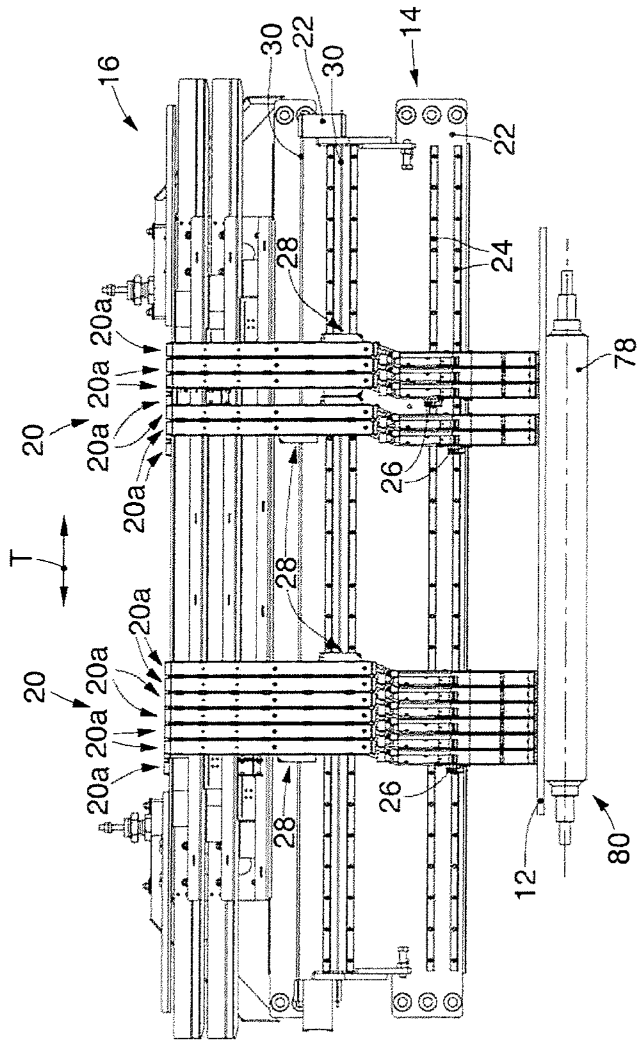
FIG. 2 is a front view of longitudinal operating units in one embodiment.

FIGS. 1*a*, 1*b* are used to describe embodiments of a machine 10 used to carry out works of cutting and/or continuous and/or discontinuous toothed creasing, and/or pre-creasing, on a relatively rigid material, in this case a sheet 12 of cardboard, for example a single sheet, a sheet of a continuous module but also a portion of a strip, a sheet coming from a pile, or two or more sheets coming from two or more piles and fed in parallel to the machine 10.

Merely by way of example, the continuous or discontinuous toothed creasing, or the cutting, carried out on the sheet 12 of cardboard by the machine 10 are intended to promote the precise and linear folding of the cardboard, for example in the steps of automated production of a box for packaging.

The machine 10, according to the present invention and with reference to FIGS. 2-5, comprises a support structure 14, disposed transverse with respect to a direction of feed F of the sheets 12.

At least two longitudinal operating groups 16 for cutting and/or continuous or discontinuous toothed creasing, or pre-creasing, are mounted on the support structure 14 and are disposed in sequence with respect to each other. A transverse operating group 18 for cutting and/or creasing, or pre-creasing, is also mounted on the support structure 14, positioned upstream of the two longitudinal operating groups 16.

Each longitudinal operating group 16 and the transverse operating group 18 comprise a plurality of operating units 20 to work a relatively rigid material.

The operating units 20 have common characteristics and components and are then distinguished on the basis of installation and functional requirements, specific to the longitudinal operating groups 16 and the transverse operating group 18, respectively in longitudinal operating units 20*a* and transverse operating units 20*b* as described hereafter.

Each operating unit 20 is suitable to support, move and command a corresponding cutting tool 32 or, alternatively, a corresponding continuous toothed creasing tool 34.

In one embodiment, the operating unit 20 can be able to support, move and command another discontinuous toothed creasing tool 42, able to perform a different and distinct work from the continuous toothed creasing tool 34.

Each operating unit 20 also comprises a support flange 36 able to support the cutting tool 32, or continuous toothed creasing tool 34, or discontinuous toothed creasing tool 42, in order to determine the operating descent pressure of the corresponding work tool 32, or 34, or 42 on the sheet 12, and also a pneumatic condition of ascent from the sheet 12 of the corresponding work tool 32, or 34, or 42.

In this way, for each cut and/or continuous and/or discontinuous toothed creasing to be carried out on the sheet 12, each operating unit 20 is moved individually and independently from the others in order to position the corresponding cutting tool 32 and/or continuous toothed creasing tool 34 and/or discontinuous toothed creasing tool 42 in a determinate predefined working position.

The operating unit 20 comprises a pneumatic drive unit 40.

Figure 6:
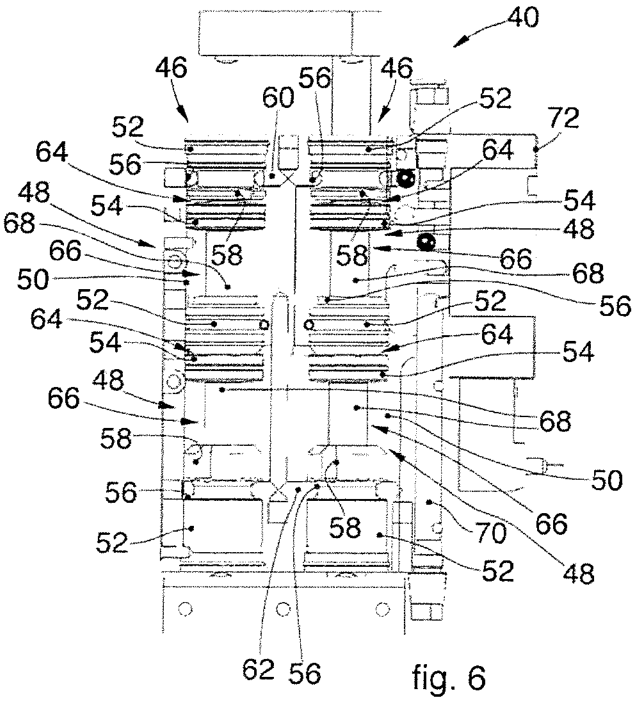
FIG. 6 is a front view of a pneumatic drive unit in one embodiment.
Figure 7:
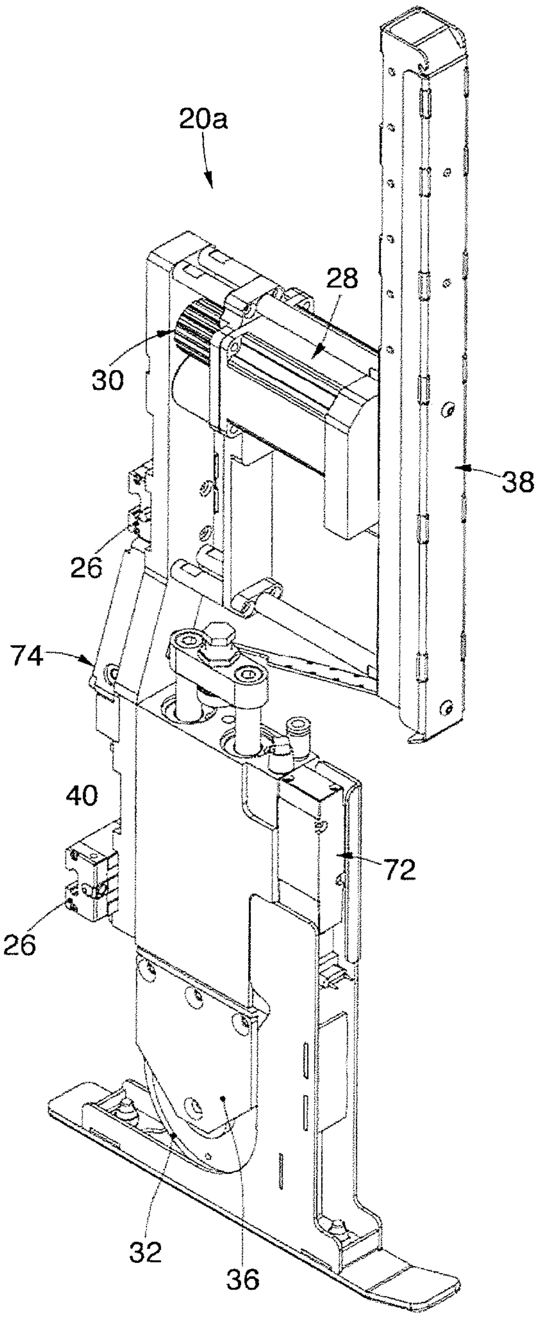
FIG. 7 is a perspective view of a longitudinal operating unit in one embodiment.
Figure 8:
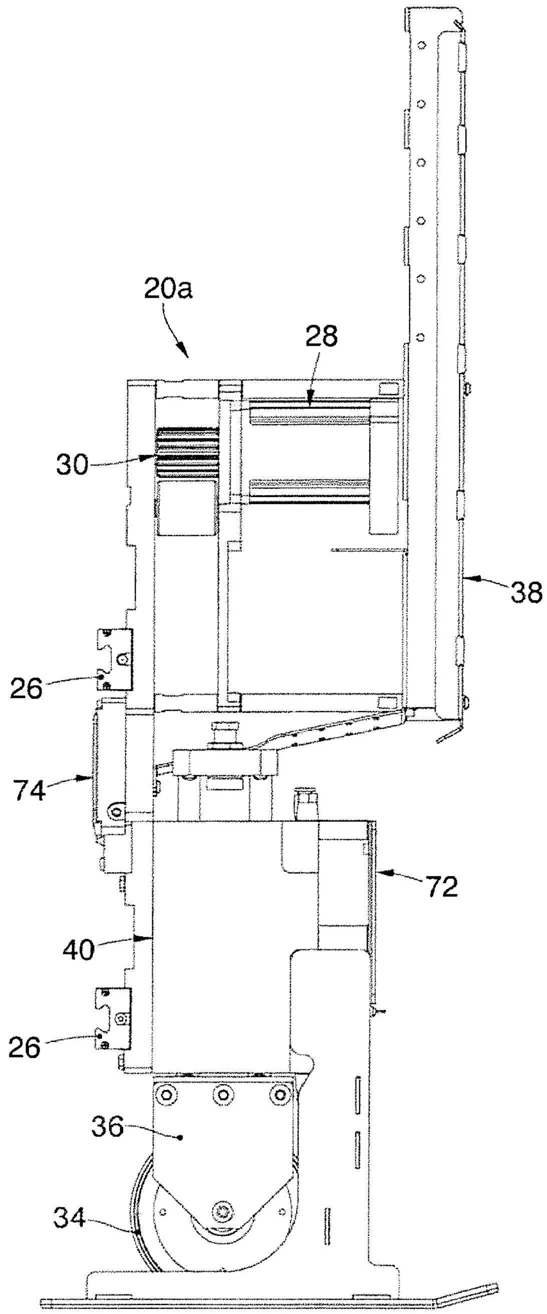
FIG. 8 is a front view of a longitudinal operating unit in one embodiment.
Figure 9:
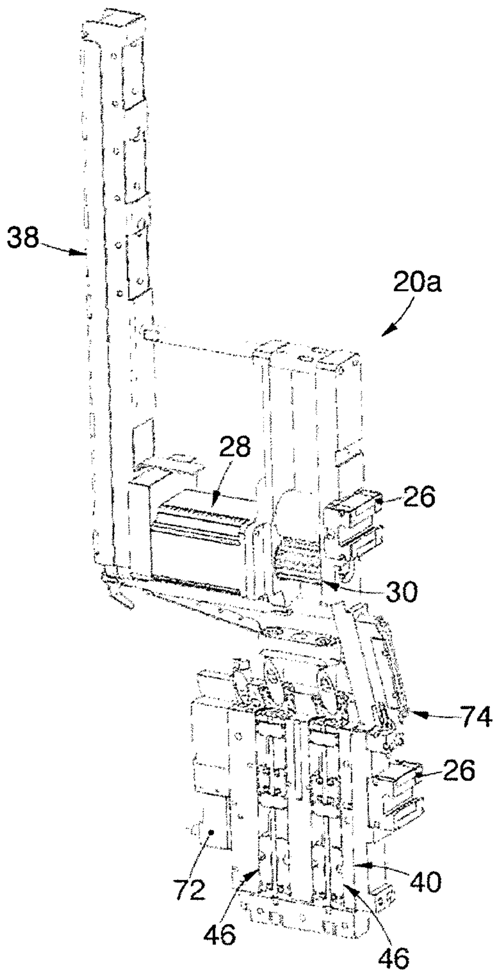
FIG. 9 is a section of a pneumatic drive unit in one embodiment.

With reference to FIG. 6, the pneumatic drive unit 40 comprises two pairs of pneumatic drive members 46.

Each pair of pneumatic drive members 46 is provided with two double-effect pistons 48 configured to work parallel in tandem, or to operate in the same pneumatic conditions of descent or ascent, at a determinate moment of time.

In particular, the two pairs of pneumatic drive members 46 are also configured to operate in tandem at a determinate moment of time.

Each piston 48 provides a cylinder 50 made of metal material and configured to operate at high pressures.

Each cylinder 50 is configured to have two internal guide bushings 52 and mobile elements, or packings 54 installed inside it.

The guide bushings 52 are made of metal material and configured to adhere perfectly and solidly to the internal walls of each cylinder 50.

The guide bushings 52 are associated with the ends of each cylinder 50 and half way along it, thus defining the two double-effect pistons 48 of each pair of pneumatic drive members 46.

Moreover, the guide bushings 52 are configured to have circular grooves 56 and vertical grooves 58.

Advantageously, the guide bushings 52 allow to guarantee stability to the structure of the pneumatic drive unit 40 in the event that the sheet 12 is not perfectly aligned in the direction of feed F and thus it is able to avoid incorrect workings or misalignments of the operating unit 20.

Moreover the cylinder 50 has very limited sections in order to have compact operating units 20 with reduced bulk. For example, the thickness of each operating unit 20 goes from 20 mm to 40 mm, in particular from 25 mm to 35 mm.

Consequently, the two pairs of pneumatic drive members 46 allow to transmit to the cutting tool 32, to the continuous toothed creasing tool 34, to the discontinuous toothed creasing tool 42 an adequate pressure to contrast the resistance forces generated by the sheet 12.

The packings 54 are configured to guarantee the seal between two chambers of each piston 48. For example, the packings 54 can be the double-lip type.

Moreover, the packings 54 are mobile and associated with a rod 68 to transfer a movement of descent, or ascent, to the cutting tool 32 and/or the continuous toothed creasing tool 34 and/or the discontinuous toothed creasing tool 42.

The rod 68 is through inside the guide bushings 52 installed half way along the cylinders 50 and on the end near to the work tools 32, 34, 42. Moreover, each rod 68 cooperates with the flanges 36 in order to determine the pneumatic conditions of descent or ascent.

The cooperation of the guide bushings 52 with the packings 54 inside each cylinder 50 defines a tool descent chamber 64 and a tool ascent chamber 66 with a variable volume depending on the position where the packings 54 together with the rod 68 are.

The pneumatic drive unit 40 comprises a pneumatic tool-descent circuit 60 and a pneumatic tool-ascent circuit 62.

A pressurized fluid, for example air at high pressure, passes through the pneumatic tool-descent circuit 60 and the pneumatic tool-ascent circuit 62.

The pneumatic tool-descent circuit 60 supplies the pressurized fluid and connects with respect to each other the tool descent chambers 64 of each piston 48.

In a similar manner, the pneumatic tool-ascent circuit 62 supplies the pressurized fluid and connects the tool ascent chambers 66 of each piston 48 with respect to each other.

Upstream of the pneumatic tool-descent circuit 60 and of the pneumatic tool-ascent circuit 62 a feed pipe 70 is provided that receives the pressurized fluid from a pressurized fluid delivery device (not shown).

The pneumatic drive unit 40 comprises a switching valve 72 installed in correspondence to the feed pipe 70.

The switching valve 72 is connected to the pneumatic tool-descent circuit 60 and to the pneumatic tool-ascent circuit 62.

The switching valve 72 can be, for example, the 5/2 monostable, or 4/2 bistable, or 3/2 type, and is configured to determine the pneumatic condition of descent of the work tools 32, 34, 42 or the pneumatic condition of ascent of the work tools 32, 34, 42.

Advantageously, the switching valve 72 is assembled directly on board the pneumatic drive unit 40 and allows to have shorter response times to determine the pneumatic conditions of descent or ascent of the two pairs of pneumatic drive members 46 and therefore of the work tools 32, 34, 42.

In one embodiment, the pneumatic drive unit 40 can comprise a pneumatic brake 74.

The pneumatic brake 74 is installed in correspondence to the side opposite the switching valve 72 and is connected to the pneumatic tool-descent circuit 60.

Advantageously, the pneumatic brake 74 in the pneumatic condition of descent is driven by the pressurized fluid coming from the pneumatic tool-descent circuit 60, to block the operating unit 20 from possible forces generated during the working of the sheet 12 in the transverse direction T.

The operating units 20 thus configured can be installed with less bulk and are thus lighter and so increase the accelerations and de-accelerations and therefore render the fitting out operations quicker.

The pneumatic condition of descent of the cutting tool 32 or the continuous toothed creasing tool 34 or the discontinuous toothed creasing tool 42, is obtained by emitting pressurized fluid from the feed pipe 70 to the switching valve 72 that determines the circulation of the pressurized fluid in the pneumatic tool-descent circuit 60 to feed the tool descent chambers 64 of the two pairs of pneumatic drive members 46.

The pressurized fluid flows from the circular grooves 56 and then through the vertical grooves 58 to feed the tool descent chambers 64. Pressurized fluid in the tool descent chambers 64 causes the descent of the packings 54 and therefore also of the rods 68 in order to transfer the movement under pressure to the work tools 32, 34, 42.

In a similar manner, the pneumatic condition of ascent of the cutting tool 32, or the continuous toothed creasing tool 34 or the discontinuous toothed creasing tool 42 occurs, wherein the switching valve 72 diverts the pressurized fluid in the pneumatic tool-ascent circuit 62 in order to feed the tool ascent chambers 66. At the same time, the switching valve 72 allows the pressurized fluid contained in the tool descent chambers 64 to complete the inverse travel in the pneumatic tool-descent circuit 60.

With reference to FIGS. 2, 3, 7, 8 and 9 each longitudinal operating group 16 comprises a plurality of longitudinal operating units 20*a* independent from each other and mobile in a direction T transverse to the direction of feed F of the sheet 12, along corresponding support cross-pieces 22 of the support structure 14.

In particular, each longitudinal operating unit 20*a* is mounted sliding on the corresponding support cross-piece 22 by means of corresponding linear guides 24 and blocks 26.

The independent movement of each longitudinal operating unit 20*a* with respect to the corresponding support cross-piece 22 is obtained by means of a motor member 28 mounted on board each longitudinal operating unit 20*a* and kinematically connected to the support cross-piece 22 by means of a gear mechanism with belt on a pinion 30.

Advantageously, the gear mechanism with belt on a pinion 30 allows to have a quieter, quicker and more precise fitting-out step of the longitudinal operating group 16, which also does not need lubrication. Therefore, the gear mechanism with belt on a pinion 30 is also exempt from maintenance.

Moreover, the independent movement of the longitudinal operating group 16 allows to have quicker fitting-out operations.

In particular, in the longitudinal operating group 16, the longitudinal operating units 20*a* are conformed to maintain the corresponding cutting tool 32, continuous toothed creasing tool 34 or discontinuous toothed creasing tool 42, so that one or the other of the latter operate according to a direction substantially longitudinal to the direction of feed F of the sheet 12.

In a possible operating configuration, each longitudinal operating group 16 has corresponding longitudinal operating units 20*a* with, respectively, for the first longitudinal operating group 16 cutting tools 32, and for the second longitudinal operating group 16 tools for continuous toothed creasing 34, or tools for discontinuous toothed creasing 42.

In this possible configuration of the present invention the longitudinal operating units 20*a* of each longitudinal operating group 16 are disposed aligned with each other with respect to the direction of feed F of the sheet 12, so as to be able to carry out in sequence, and in an aligned manner, the operations of cutting and/or continuous or discontinuous toothed creasing, and/or pre-creasing as provided.

The longitudinal operating units 20*a* have a support structure 38 configured to reduce the bulk of each longitudinal operating unit 20*a* and thus maximize the number of longitudinal operating units 20*a* that can be installed for each longitudinal operating group 16.

The support structure 38 allows to support the motor member 28, installed in each longitudinal operating unit 20*a*, and to dispose it offset with respect to the adjacent motor members 28 of each longitudinal operating unit 20*a*, thus being able to reduce the bulk.

The profile of the support structure 38 is configured to maximize the adjacent positioning of the plurality of longitudinal operating units 20*a*.

Advantageously, with the longitudinal operating units 20*a* adjacent and offset with respect to each other it is possible to carry out operations on the sheet 12 at reduced distances.

This aspect advantageously allows to be able to work a wide range of containers, of different format and workings, obtained through cutting and/or continuous and/or discontinuous toothed creasing and/or pre-creasing of sheets 12.

Figure 4:
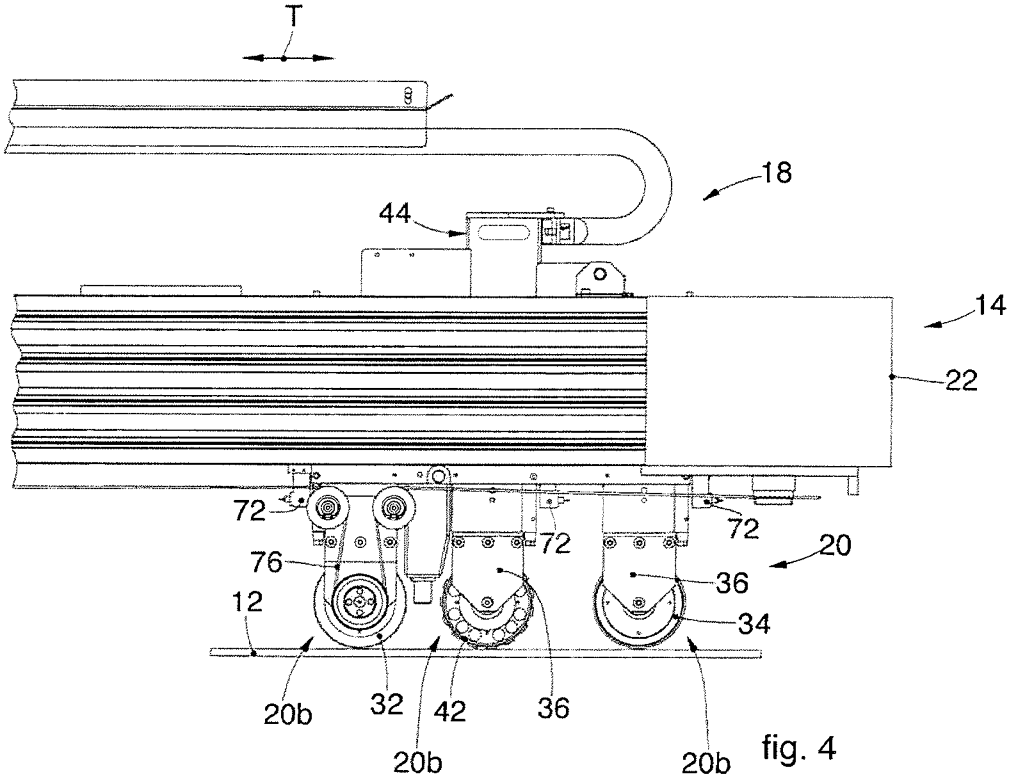
FIG. 4 is a front view of a transverse operating unit in one embodiment.
Figure 5:
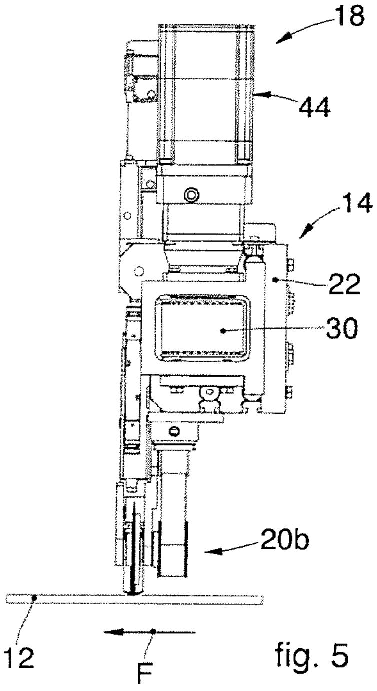
FIG. 5 is a lateral view of a transverse operating unit in one embodiment.
Figure 10:
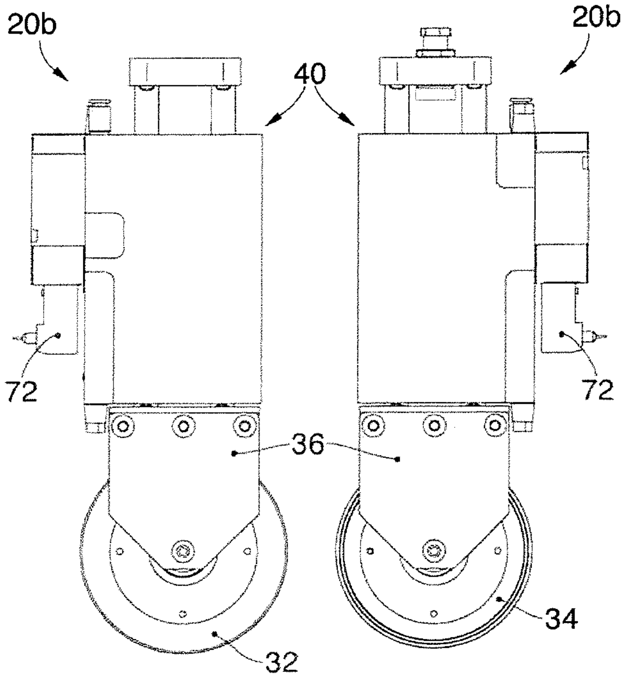
FIG. 10 is a front view of a transverse operating unit in one embodiment.
Figure 11:
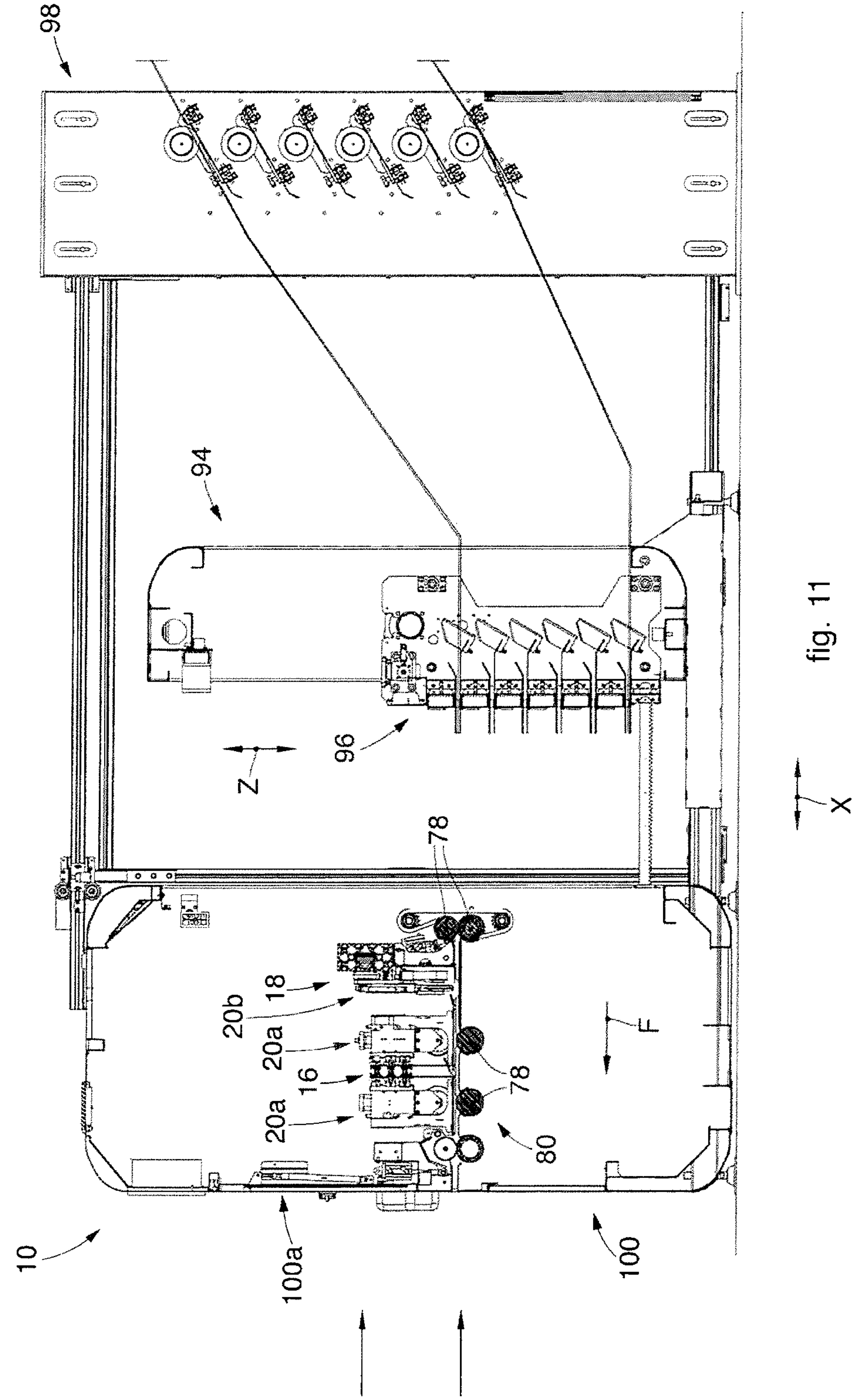
FIG. 11 is a lateral section of a machine in one embodiment.
Figure 12:
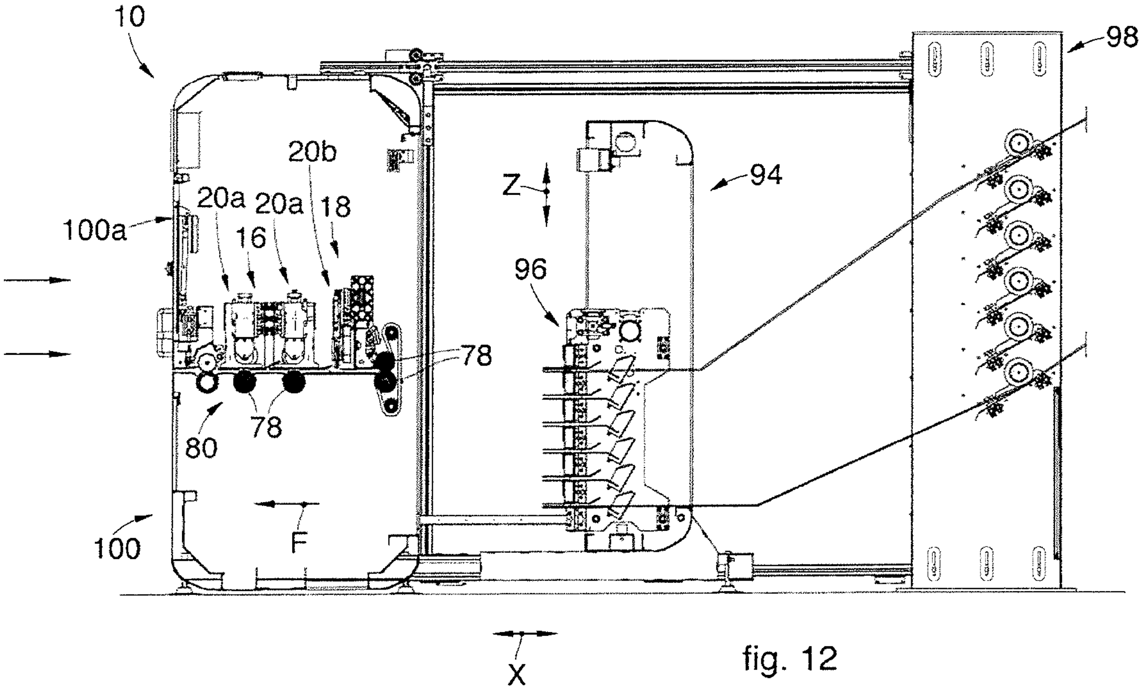
FIG. 12 is a lateral section of a machine in one embodiment.
Figure 13:
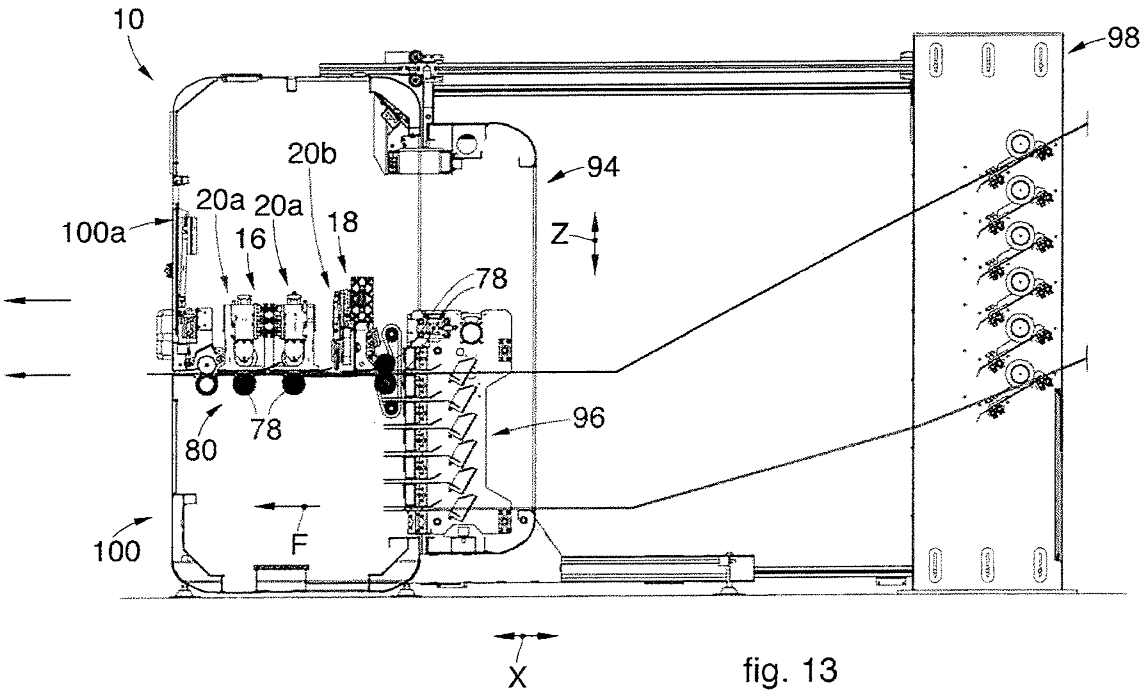
FIG. 13 is a lateral section of a machine in one embodiment.
Figure 14:
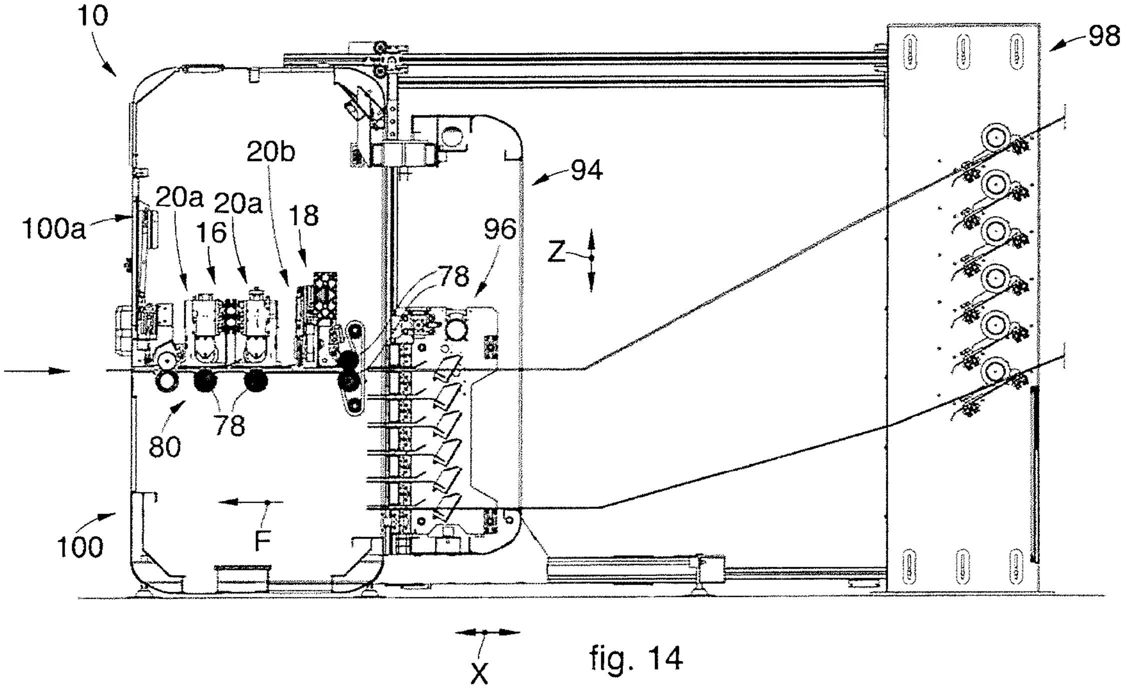
FIG. 14 is a lateral section of a machine in one embodiment.

With reference to FIGS. 4, 5, 10, the transverse operating group 18 comprises a plurality of transverse operating units 20*b*, also in this case, mobile independently from each other and suitable to support, move and command a corresponding cutting tool 32, or alternatively, a corresponding continuous toothed creasing tool 34 or discontinuous toothed creasing tool 42.

In one embodiment, the transverse operating group 18 can provide a transverse operating unit 20*b* to support, move and command another discontinuous toothed creasing tool 42.

In particular, the transverse operating units 20*b* are conformed to hold the corresponding cutting tool 32, or continuous toothed creasing tool 34 or discontinuous toothed creasing tool 42 so that one or the other of the latter operate according to a direction T substantially transverse to the direction of feed F of the sheet 12.

Advantageously, the addition of another work tool allows to increase the combination of workings that can be carried out on a sheet 12 in order to obtain the desired container.

The movement in the transverse direction T of the transverse operating units 20*b* is carried out by means of a motor member 44 mounted on board the transverse operating group 18.

The transverse operating units 20*b* are moved by a gear mechanism with belt on a pinion 30, in order to position the corresponding cutting tool 32 and/or continuous toothed creasing tool 34, and/or discontinuous toothed creasing tool 42 in a determinate pre-defined work position.

The motor member 44 of the brushless type is mounted on board the transverse operating group 18 and kinematically connected to the support cross-piece 22 by means of the gear mechanism with belt on a pinion 30.

Advantageously, the gear mechanism with belt on a pinion 30 driven by the motor member 44 allows to obtain a more rapid transverse working of cutting and/or continuous or discontinuous toothed creasing, and/or pre-creasing, since this type of operation is characterized by a static feed. Moreover, the gear mechanism with belt on a pinion 30 brings the same advantages described for the longitudinal operating groups 16.

For example, the speed of the transverse operating group 18 goes from 80 m/min to 115 m/min, in particular from 90 m/min to 110 m/min.

In one embodiment shown in FIGS. 4 and 5, the transverse operating group 18 can provide a secondary belt 76 attached to the support structure 14.

The secondary belt 76 is associated with the cutting tool 32 and/or continuous toothed creasing tool 34 and/or discontinuous toothed creasing tool 42 by means of an “omega” shaped connection.

The rectilinear movement of the transverse operating units 20*b* in the transverse direction T transmits the rotation motion to the work tools 32, 34, 42 thanks to the “omega” shaped connection.

The machine 10 also comprises one or more control and command units 110, not shown, which are electronically connected to the movement members of each operating unit 20, in order to coordinate, according to a desired operating program, the positions and drives of each single cutting tool 32, and/or continuous toothed creasing tool 34 and/or discontinuous toothed creasing tool 42.

In one embodiment shown in FIGS. 1*a*, 1*b*, one or more control and command units 110 can be installed on board in an ergonomic manner and accessible from the outside through protections made of transparent material, for example plastic.

The machine 10 also comprises a drawing unit 80 able to move the sheet 12 (FIGS. 11-15, 16).

The drawing unit 80 comprises a plurality of movement rollers 78 disposed on the side opposite the longitudinal operating groups 16 and the transverse operating group 18 with respect to a hypothetical horizontal feed plane of the sheet 12. The movement rollers 78 determine the feed of the sheet 12 in the direction of feed F in cooperation with the longitudinal operating groups 16 and the transverse operating group 18.

The movement rollers 78 also have the function of contrasting the action of cutting and/or continuous and/or discontinuous toothed creasing, and/or pre-creasing carried out by the work tools 32, 34, 42.

According to one embodiment, the movement rollers 78 can be made of both rubber and iron, for example to carry out cutting operations on iron.

The drawing unit 80 is moved by a gear mechanism with belt 82 and is driven by an electric motor member 112 of the brushless type.

This aspect allows to obtain a more silent movement and does not need maintenance, as well as guaranteeing greater speed in the drawing of the sheet 12.

For example, the drawing speed goes from 45 m/min to 65 m/min, in particular from 50 m/min to 60 m/min.

Figure 17:
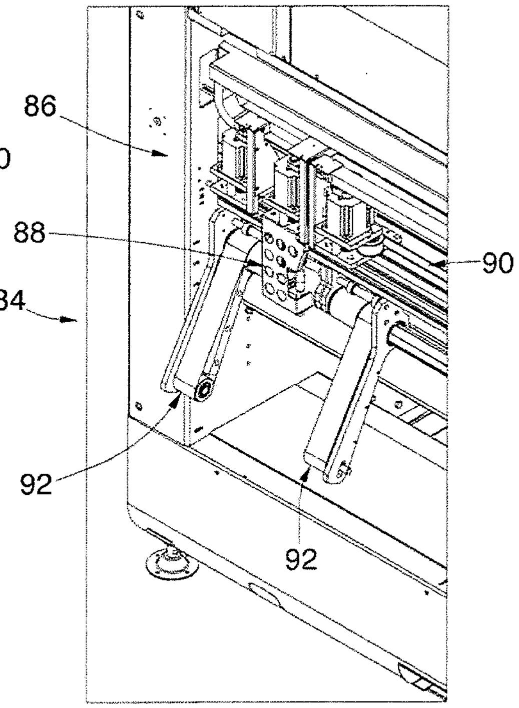
FIG. 17 is a detailed view of a machine in one embodiment.

In an embodiment shown in FIG. 17, the drawing unit 80 can be associated with an extraction unit 84 to expel the sheet 12 once the cutting and/or continuous and/or discontinuous toothed creasing and/or pre-creasing operations have been terminated.

The extraction unit 84 provides a central support 86 to support an extraction element 88.

The central support 86 is associated with a gear mechanism with belt 90 driven by an electric motor member.

In an embodiment shown in FIG. 17, the drawing unit 80 and the extraction unit 84 can be driven by the same electric motor member 112.

Moreover, the extraction unit 84 provides at least two movement belts 92 (FIG. 17) able to discharge work offcuts of the sheet 12.

At the moment the offcut is extracted, the extraction element 88 is lowered by the central support 86 to direct the offcut downward, guided by the movement belts 92.

In one embodiment, the machine 10 can comprise a feed/introduction unit of the sheets 12 directly installed in the machine 10.

The feed/introduction unit allows the correct introduction of the sheets 12 by driving an electric motor member of the brushless type.

The electric motor member of the feed/introduction unit is completely autonomous from the electric motor member 112 of the drawing unit 80, thus allowing to be able to carry out completely autonomously and sequentially the operations necessary for the introduction of a new sheet 12 with respect to the cutting and/or continuous and/or discontinuous toothed creasing, and/or pre-creasing workings.

In another embodiment shown in FIGS. 1*a*, 1*b*, 11-15, the machine 10 can be associated with a loading device, or selector 94 for the automatic loading of the sheets 12 to be worked in the machine 10.

The loading device 94 comprises a multiple introducer device 96 able to selectively introduce a plurality of sheets 12 toward the drawing unit 80.

The multiple introducer device 96 comprises at least its own electric motor member of the brushless type in order to translate in a lifting direction Z transverse to the direction of feed F of the sheet 12.

The multiple introducer device 96 is the known type, described in the patent application ITUD2014A000108 and provides the removal of the sheets from a store by means of a removal and transport device 98.

In one embodiment, the multiple introducer device 96 comprises at least its own electric motor member of the brushless type to feed the sheet 12.

In a similar manner to the embodiment previously described, the electric motor member 112 of the drawing unit 80 is completely autonomous from the electric motor member of the brushless type of the multiple introducer device 96.

Advantageously, the separate motorizations allow to lower the waiting times due to the choice and loading of the new sheet 12 to be worked in the machine 10. For example, this embodiment allows to save from 5% to 20% of operating time.

In this way, while the machine 10 is still finishing the cutting and/or continuous and/or discontinuous toothed creasing and/or pre-creasing operations, the loading device 94 provides to load a new sheet 12 removed from the store.

In another embodiment shown in FIGS. 11-15, the loading device 94 is provided with another electric motor member of the brushless type configured to determine a forward/backward translation in a direction of translation X parallel to the direction of feed F. In particular, the electric motor member allows to distance the loading device 94 from the machine 10 to a sufficient distance to allow an operator to carry out short maintenance interventions, for example, to remove the sheets 12 that obstruct the multiple introducer device 96.

Figure 15:
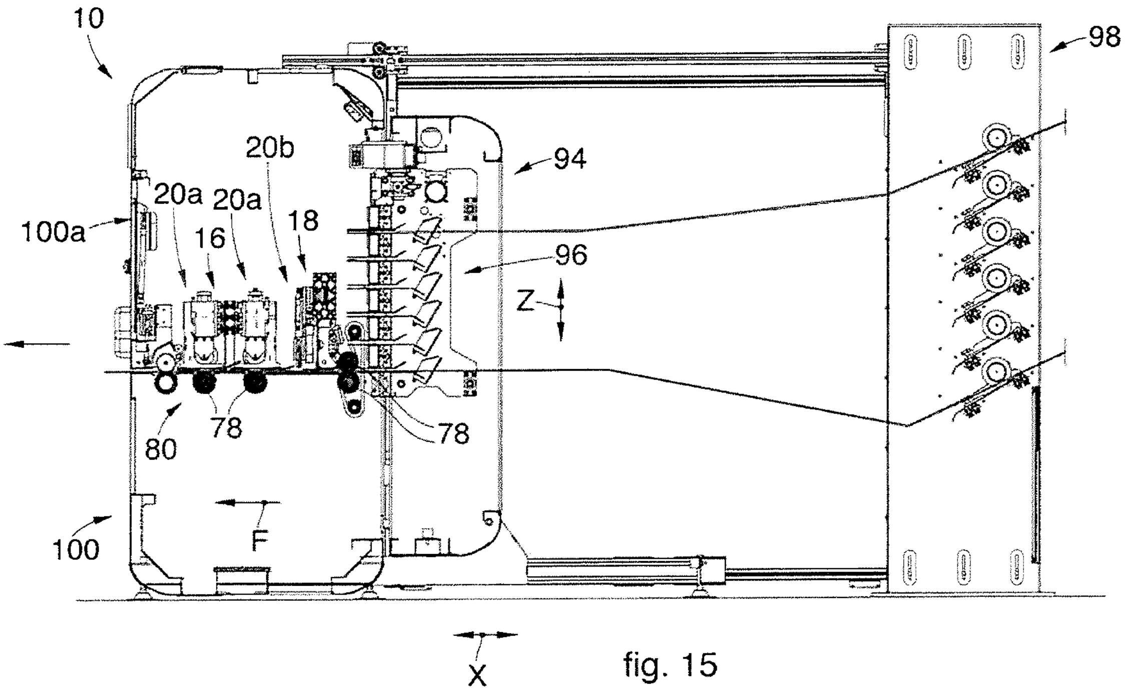
FIG. 15 is a lateral section of a machine in one embodiment.
Figure 16:
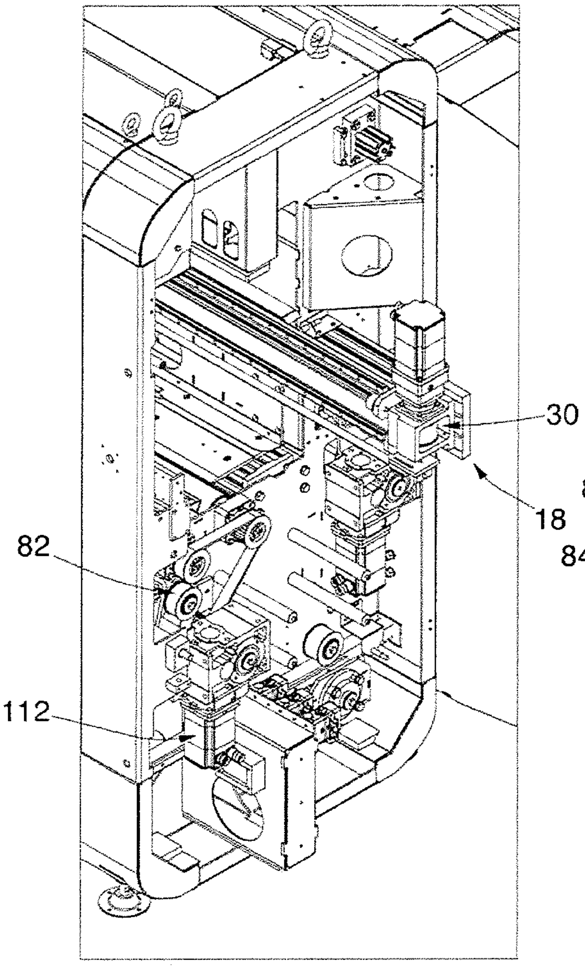
FIG. 16 is a detailed view of a machine in one embodiment.

The present invention also concerns a method for loading the sheets 12 into the machine 10 that provides:

- to distance the loading device 94 from the machine 10 in the direction of translation X (FIG. 11) in order to carry out the maintenance operation;
- to bring the loading device 94 nearer to the machine 10 in the direction of translation X (FIG. 12) and to insert the sheet 12 by the multiple introducer device 96 into the machine 10 to carry out the working of the sheet 12;
- after the cutting and/or continuous and/or discontinuous toothed creasing, and/or pre-creasing of the sheet 12 by the transverse operating group 18, the loading device 94 moves away from the machine 10 in the direction of translation X, while the machine 10 finishes the workings of the sheet 12 carried out by the longitudinal operating groups 16 (FIG. 13);
- the translation of the multiple introducer device 96 in the direction of lifting Z in order to position the new sheet 12 at the entrance to the machine 10 (FIG. 14);
- the introduction of the new sheet 12 into the machine 10 by translation of the multiple introducer device 96 in the direction of translation X (FIG. 15).

In an embodiment shown in FIGS. 1*a* and 1*b* the machine 10 can be provided with a guard 100 to cover and protect it.

The guard 100 can be made of metal material, for example of thin metal 10 sheets, of 2 mm to 5 mm for example, obtained by laser cutting and cooperating with each other by means of jointing and/or welding.

In one embodiment, the guard 100 can be partly or completely made of plastic, carbon or a composite material.

The guard 100 is provided with front guards 100*a* and lateral guards 100*b*.

In one embodiment, the front guards 100*a* are equipped with button-type opening means with a gas spring and pistons.

The lateral guards 100*b* are provided with opening hinges to allow to easily replace the components of the longitudinal operating groups 16, or the transverse operating group 18 by means of lateral extraction from the machine 10.

It is clear that modifications and/or additions of parts may be made to the pneumatic drive unit 40 and to the corresponding machine 10 to work relatively rigid material as described heretofore, without departing from the field and scope of the present invention.

It is also clear that, although the present invention has been described with reference to some specific examples, a person of skill in the art shall certainly be able to achieve many other equivalent forms of pneumatic drive unit 40 and to the corresponding machine 10 to work relatively rigid material, having the characteristics as set forth in the claims and hence all coming within the field of protection defined thereby.

The invention claimed is:

1. A machine for working a relatively rigid material, comprising:

a drawing unit adapted to move a sheet of relatively rigid material in a longitudinal direction of feed;

at least two longitudinal operating groups with a plurality of longitudinal operating units configured to operate in substantially said longitudinal direction; and a transverse operating group with a plurality of transverse operating units configured to operate in a direction substantially transverse to said longitudinal direction, wherein:

each of said longitudinal operating units and each of said transverse operating units is adapted to support, move and command one or more respective tools each taken from the group consisting of a cutting tool, a tool for continuous toothed creasing, and a tool for discontinuous toothed creasing; and each of said operating units comprises a pneumatic drive unit and a flange supporting the one or more respective tools, the pneumatic drive unit comprising two pairs of pneumatic drive members, each of said pairs comprising two double-effect pistons mounted on a rod installed inside a cylinder, the rods of said two pairs of pneumatic drive members being connected to said flange and being positioned on respective mutually parallel and transversely spaced vertical axes, the double-effect pistons work in tandem or to operate in the same operating condition of descent or ascent at a determined moment of time, said double-effect pistons being connected to each other by a pneumatic tool-descent circuit and by a pneumatic tool-ascent circuit, both able to supply a pressurized gaseous fluid to all of said pistons, said pneumatic drive unit further comprising a switching valve mounted directly on said pneumatic drive unit, connected to said pneumatic tool-descent circuit and said pneumatic tool ascent circuit and configured to determine a pneumatic condition of descent, or ascent, of said two pairs of pneumatic drive members, the cylinder of each of said double-effect pistons have two internal guide bushings and mobile packings, the packing of each piston being mounted perpendicular to a corresponding rod to guarantee a seal between two chambers of each piston, said pairs of pneumatic drive members transmit to the one or more respective tools a movement of descent or ascent in a perpendicular direction with respect to the sheet and with a pressure adequate to contrast resistance forces generated by the sheet.

2. The machine as defined in claim 1, further comprising a gear mechanism with a belt on a pinion driven by a motor and configured to move said longitudinal operating units and said transverse operating units.

3. The machine as defined in claim 1, further comprising a gear mechanism with a belt configured to move said drawing unit and driven by an electric motor member of a brushless type cooperating with an extraction unit.

4. The machine as defined in claim 3, further comprising a multiple introducer device able to selectively introduce a plurality of sheets to said drawing unit.

5. The machine as defined in claim 4, wherein said multiple introducer device comprises at least one respective electric motor member of the brushless type to feed the sheet, said at least one respective electric motor member being completely autonomous with respect to said electric motor of the brushless type of said multiple introducer device.

6. The machine as defined in claim 4, wherein said multiple introducer device is provided with another electric motor member configured to determine a forward/backward translation in a direction of translation, parallel to the direction of feed.

7. The machine as defined in claim 3, further comprising an extraction unit of said sheets associated to a gear mechanism with a belt driven by said motor member of the drawing unit.

8. The machine as defined in claim 7, wherein said extraction unit comprises at least two movement belts able to discharge work offcuts of said sheets.

9. The machine as defined in claim 1, wherein said transverse operating group is provided with a belt associated with said one or more respective tools by an omega-shaped connection to transmit rotation motion imparted by the movement of said transverse operating units in the transverse direction.

10. The machine as defined in claim 1, further comprising one or more control and command units installed on board, in an ergonomic manner and accessible from outside.

11. The machine as defined in claim 1, wherein said machine is provided with front guards equipped with button-type opening means with a gas spring and pistons, and lateral guards provided with opening hinges.

12. The machine as defined in claim 1, wherein a feed pipe connected to a pressurized fluid delivery device is provided upstream of said pneumatic tool-descent circuit and said pneumatic tool-ascent circuit.

13. The machine Machine-as defined in claim 1, wherein the sheet of relatively rigid material is made of cardboard.

* * * * *